(12) United States Patent
Wang (10) Patent No.: US 12,532,252 B2
(45) Date of Patent: Jan. 20, 2026

(54) METHODS OF FLEXIBLE 5G NETWORK SLICE DEPLOYMENT ON gNB LEVEL

(71) Applicant: T-Mobile Innovations LLC, Overland Park, KS (US)

(72) Inventor: Jun Wang, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 481 days.

(21) Appl. No.: 17/886,229

(22) Filed: Aug. 11, 2022

(65) Prior Publication Data

US 2024/0056957 A1  Feb. 15, 2024

(51) Int. Cl.
*H04W 48/18* (2009.01)

(52) U.S. Cl.
CPC .................... *H04W 48/18* (2013.01)

(58) Field of Classification Search
CPC . H04W 48/18; H04W 36/08; H04W 36/0061; H04W 36/304; H04W 36/22
See application file for complete search history.

(56) References Cited

U.S. PATENT DOCUMENTS

| | | | |
|---|---|---|---|
| 2023/0115367 A1* | 4/2023 | Saha | H04W 36/0061 370/331 |
| 2023/0189132 A1* | 6/2023 | Kim | H04W 48/18 455/435.1 |
| 2024/0292301 A1* | 8/2024 | Naseer-Ul-Islam | H04W 36/0085 |
| 2025/0168074 A1* | 5/2025 | Gürsu | H04L 41/0895 |

* cited by examiner

*Primary Examiner* — Romani Ohri
(74) *Attorney, Agent, or Firm* — SHOOK, HARDY & BACON L.L.P.

(57) ABSTRACT

Systems and methods are provided for deploying one or more network slices at a service node corresponding to a user device of a telecommunications network includes a slice management system communicatively coupled to the user device. The slice management system is to receive at least one of a service request or handover request corresponding to a user device, determine a service node change from the at least one of the service request or the handover request, determine one or more supported network slices corresponding to at least one of a new service node or a previous service node corresponding to the user device, and update the user device with the one or more supported network slices corresponding to the new service node based on a difference of at least one supported network slice between the previous service node and the new service node.

20 Claims, 5 Drawing Sheets

METHODS OF FLEXIBLE 5G NETWORK SLICE DEPLOYMENT ON gNB LEVEL

SUMMARY

The present disclosure is directed, in part, to deploying one or more network slices at a service node corresponding to a user device of a telecommunications network, substantially as shown in and/or described in connection with at least one of the figures, and as set forth more completely in the claims.

In aspects set forth herein, the signal strength(s) associated with one or more target nodes are received. Typically, network slices are deployed on the Tracking Area (TA) level. The nodes within the TA support the same set of network slices such that the user device cannot utilize the registration procedure if the user device enters a new node that has the same TA as the previous node. Therefore, the network may not update the user device with the supported network slices under the new node. However, here, a service node change is determined and the user device is updated with one or more supported network slices corresponding to the new service node which provides flexible deployment of network slices at the node level.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for deploying one or more network slices at a service node corresponding to a user device of a telecommunications network (e.g., a 5G New Radio network or any other suitable network). At least one of a service request or handover request corresponding to a user device is received. A service node change is determined from the at least one of the service request or the handover request. One or more supported network slices corresponding to at least one of a new service node or a previous service node corresponding to the user device is determined. The user device is updated with the one or more supported network slices corresponding to the new service node based on a difference of at least one supported network slice between the previous service node and the new service node.

Advantageously, providing methods and systems for deploying one or more network slices at a service node corresponding to a user device of a telecommunications network provides flexibility to update the user device with the supported network slice(s) under the new service node if the user device enters a new service node that has the same tracking area.

In one aspect, a method is provided for deploying one or more network slices at a service node corresponding to a user device of a telecommunications network. The method includes receiving, by a slice management system, at least one of a service request or handover request corresponding to a user device. The method also includes determining a service node change from the at least one of the service request or the handover request. The method further includes one or more supported network slices corresponding to at least one of a new service node or a previous service node corresponding to the user device. The method further includes updating the user device with the one or more supported network slices corresponding to the new service node based on a difference of at least one supported network slice between the previous service node and the new service node.

In another aspect, a computer-readable storage media having computer-executable instructions embodied thereon is provided that, when executed by one or more processors, cause the processors to perform various steps. The processors are caused to receive, via a slice management system, at least one of a service request or handover request corresponding to a user device. The processors are also caused to determine a service node change from the at least one of the service request or the incoming handover request. The processors are further caused to determine one or more supported network slices corresponding to at least one of a new service node or a previous service node corresponding to the user device, wherein the previous service node and the new service node correspond to a tracking area. The processors are further caused to update the user device with the one or more supported network slices corresponding to the new service node based on a difference of at least one supported network slice between the previous service node and the new service node.

In yet another aspect, a system is provided for deploying one or more network slices at a service node corresponding to a user device of a telecommunications network. The system includes a slice management system communicatively coupled to a user device. The slice management system receives at least one of a service request or handover request corresponding to a user device. The slice management system also determines a service node change from the at least one of the service request or the handover request. The slice management system further determines one or more supported network slices corresponding to at least one of a new service node or a previous service node corresponding to the user device. The slice management system further updates the user device with the one or more supported network slices corresponding to the new service node based on a difference of at least one supported network slice between the previous service node and the new service node.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components communicatively coupled to a computing device and/or at a base station, cell site, and/or cell tower having an antenna, an antenna array, a radio, a transceiver, and/or a controller. Generally, an access point (e.g., the access point 220 illustrated in FIG. 2) may communicate directly with user equipment according to one or more access technologies (e.g., 3G, 4G, 5G, mMIMO, Wi-Fi, etc.) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
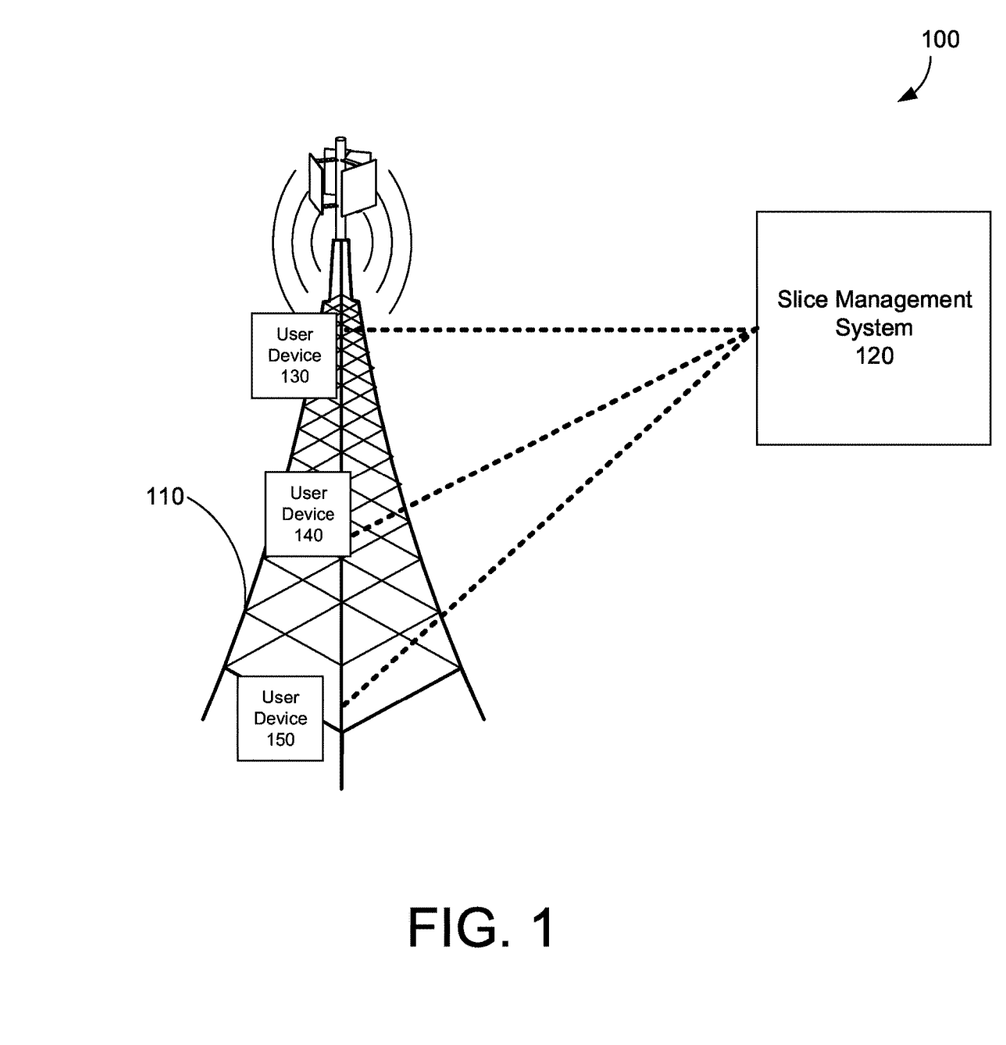
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes (e.g., service node(s) 110), etc. which are not shown so as not to confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between the one or more user devices (e.g., the user devices 130, 140, and 150) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone mode. In the non-stand alone (NSA) mode the network environment 100 may take the form of, for example, an E-UTRAN New Radio-Dual Connectivity (EN-DC) network. In an EN-DC network, a user device (e.g., the user devices 130 and/or 140) may connect to or otherwise access a 4G, LTE, 5G, or any other suitable network simultaneously. In the stand alone mode, the telecom network may take the form of a 5G network or any other suitable network.

In some embodiments, the network environment 100 may include a slice management system (e.g., the slice management system 120). The slice management system may be communicatively coupled to the user device(s) 130, 140, and/or 150 such that the slice management system may be structured to transmit to and receive requests and/or data from one or more user devices. The slice management system 120 may be communicatively coupled to one or more nodes (e.g., the service node 110). For example the slice management system 120 may be communicatively coupled to an Evolved Node B (e.g., eNodeB or eNB), a Next Generation Node B (e.g., gNodeB or gNB), a combination thereof, or any other suitable node structured to communicatively couple to the user device(s) 130, 140, and/or 150.

In some embodiments, the user device (e.g., the user devices 130, 140, and/or 150) may take the form of a wireless or mobile device capable of communication via the network environment 100. For example, the user device 130 may take the form of a mobile device capable of communication via a telecom network such as, but not limited to, a wireless telecommunication network. In this regard, the user device may be any mobile computing device that communicates by way of a network, for example, a 4G, LTE, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunications providers that provide services (e.g. 5G, voice, location, data, etc.) to one or more user devices. For example, the user devices 130, 140, and 150 may be subscribers to a telecommunication service provider, in which the user devices are registered or subscribed to receive voice and data services (e.g., receive content that may be streamed, downloaded, etc.) over the network environment 100. The network environment 100 may include any communication network providing voice and/or data service(s), such as, for example, a 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular component or may be represented in a particular quantity in FIG. 1, it will be appreciated that some aspects may include a plurality of devices and/or components such that FIG. 1 should not be considered as limiting the quantity of any device and/or component.

Figure 2A:
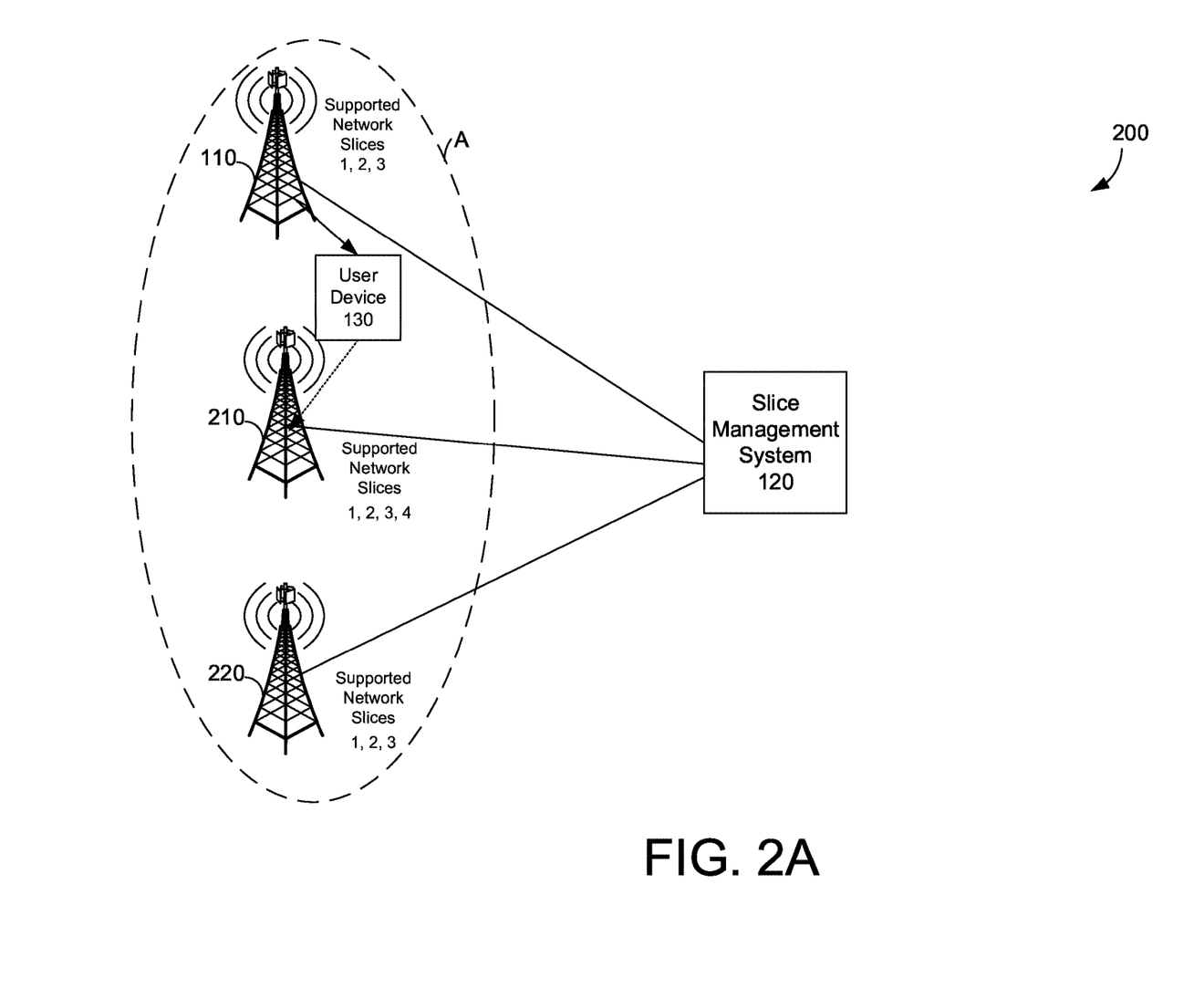
FIG. 2A is a diagram of a network environment including a plurality of service nodes in a tracking area and a slice management system in accordance with an example embodiment.
Figure 2B:
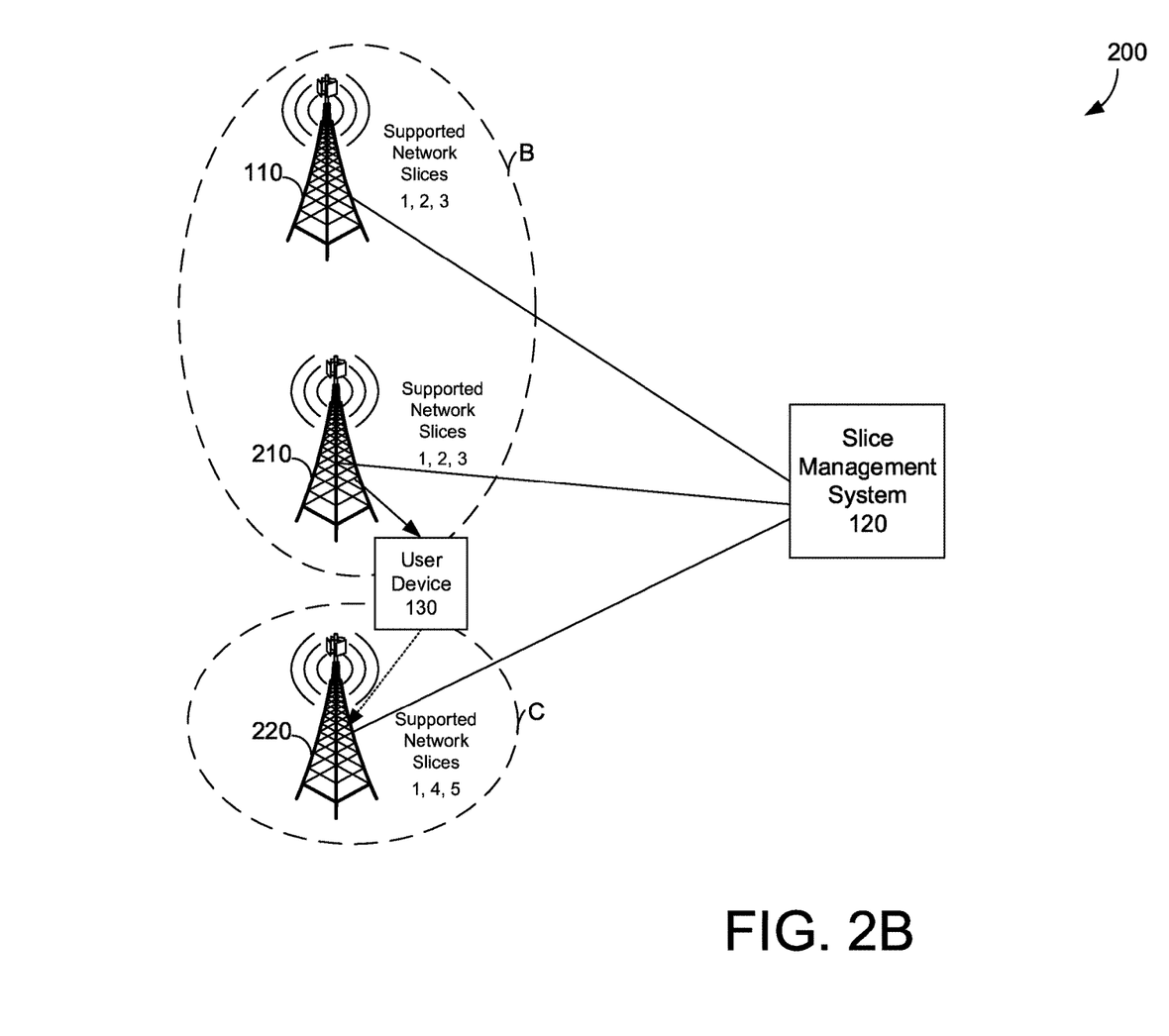
FIG. 2B is a diagram of a network environment including a plurality of service nodes in a plurality of tracking areas and a slice management system in accordance with an example embodiment.

FIGS. 2A and 2B are diagrams of the network environment 200 (e.g., a telecommunication network such as, but not limited to, a wireless telecommunication network) according to an example embodiment. In the present embodiment, the network environment 200 includes the service node 110, 210, and 220, slice management system 120, user device 130, and tracking area A (FIG. 2A) and tracking area B and C (FIG. 2B). Although some of the components in the network environment 200 are depicted as single components (e.g., a single user device or slice management system), in some embodiments, the network environment 200 may include a plurality of such components from 1 to N.

In some examples, the slice management system (e.g., the slice management system 120) may receive at least one of a service request or handover request corresponding to a user device (e.g., the user device 130). The slice management system may include or otherwise may take the form of an Access and Mobility management function (AMF). The handover request may include an inbound handover (e.g., an incoming Xn based handover). The slice management system may be communicatively coupled to the user device such that the slice management system may receive the service request or handover request provided by the user device that are associated with the service node(s) 110, 210, and/or 220. In some embodiments the slice management system 120 may determine a service node change from the service request, the handover request, or a combination thereof. In this regard, the slice management system 120 (e.g., the AMF) may detect a service node (e.g., a serving gNodeB or gNB) change.

In some embodiments, the slice management system may determine one or more supported network slices corresponding to at least one of a new service node or a previous service node corresponding to the user device. For example, the slice management system 120 may determine the supported network slices corresponding to the previous service node 110 are the supported network slices 1, 2, and 3. The slice management system 120 may determine the supported network slices corresponding to the new service node 210 are the supported network slices 1, 2, 3, and 4 (FIG. 2A).

The previous service node and the new service node may include or otherwise take the form of a Next Generation Node B (e.g., a serving gNodeB or gNB). In such embodiments, the slice management system (e.g., the AMF) may identify or otherwise determine the difference of the supported network slices (e.g., the supported network slice 4 in FIG. 2A) corresponding to the new serving gNB (e.g., the new service node 210) and the previous serving gNB (e.g., the previous service node 110) of the user device 130.

In some examples, the previous service node and the new service node may correspond to one or more tracking areas A, B, and/or C. As illustrated in FIG. 2A, the previous service node 110 and the new service node 210 correspond to or is otherwise included in the tracking area A. As illustrated in FIG. 2B, the previous service node 210 corresponds to or is otherwise included in the tracking area B and the new service node 220 corresponds to or is otherwise included in the tracking area C. The one or more service nodes may be associated with a cell site or a plurality of cell sites. The cell site(s) may include one or more service nodes, amplifiers, antennas, base transmitter stations, radios, transmitter/receivers, digital signal processors, control electronics, GPS equipment, power cabinets or power supply, base stations, charging stations, etc. such that the cell site may provide a communication link between one or more user devices and other components, systems, equipment, and/or devices of the network environment 200. The cell site may be operable in a non-stand alone mode (e.g., operable in an EN-DC network) or in a stand alone mode (e.g., operable in a 5G network or any other suitable network).

The slice management system may update the user device with the one or more supported network slices 1 and 4 (FIG. 2B) corresponding to the new service node 220 based on a difference of the at least one supported network slice between the previous tracking area B and the new tracking area C. For example, if the new service node 220 of the user device (e.g. the new serving gNB) supports a different network slice (e.g., supported network slice 4) than the previous service node 210 (e.g., the previous serving gNB), the slice management system (e.g., the AMF) may update the user device with the supported network slices under the new service node. If the user device has entered a new service node 210 (FIG. 2A) that has the same tracking Area (e.g., the tracking area A) as the previous service node 110, the user device 130 cannot use the registration procedure such that the telecommunications network may update the user device 130 with the supported network slice(s) under the new service node 210. To overcome the disadvantage of network slice deployment scenario based on service node level rather than tracking area level (as illustrated in FIG. 2A), the slice management system shall detect a change of service node of the user device within the same tracking area, and upon which update the user device with the new supported network slices accordingly.

In some embodiments as illustrated in FIG. 2A, an update command may update the user device with the one or more supported network slices by including the allowed Network Slice Selection Assistance Information (NSSAI) (e.g., supported network slice 4) corresponding to the new service node. Alternatively or additionally, the update command may update the user device network slice selection policy using, for example, the UE Route Selection Policy (URSP) included in the user device Policy Container of the downlink non-access stratum transport (DL NAS Transport) message.

The slice management system, in some embodiments, may be structured to or otherwise may update the user device (e.g., the user device 130) with the one or more supported network slices corresponding to a new tracking area (e.g., the tracking area C of FIG. 2B) based on a difference of at least one supported network slice between the previous tracking area (e.g., the tracking area B of FIG. 2B) and the new tracking area (e.g., the tracking area C of FIG. 2B).

The user device may utilize the received NSSAI, UE Route Selection Policy (URSP), etc. that correspond to the new service node (e.g., the new serving gNB such as the new service node 210). In turn, the user device may initiate or otherwise request a packet data unit (PDU) session release and/or a PDU establishment update PDU session according to the supported network slice(s) (e.g., supported network slice 4 in FIG. 2A) under the new service node.

Figure 3:
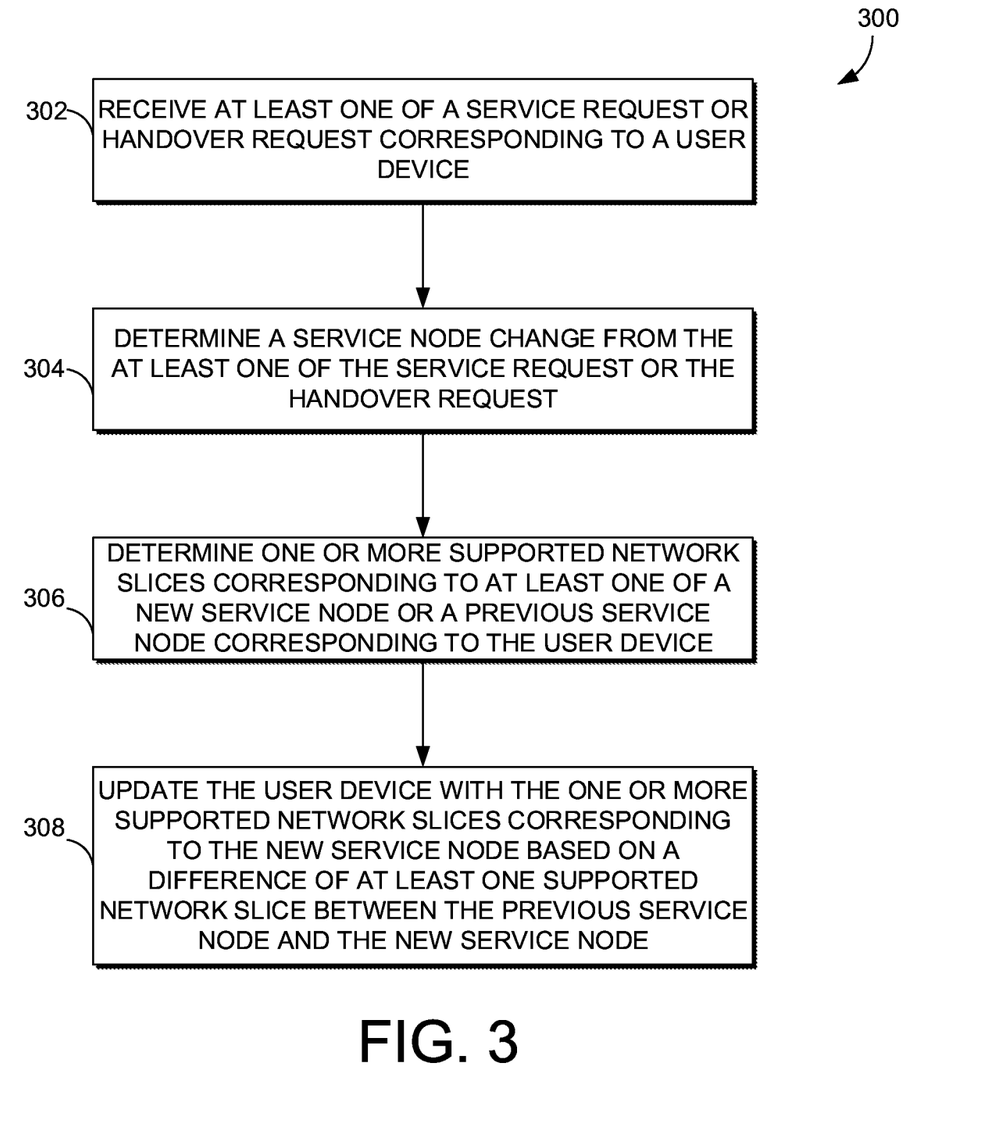
FIG. 3 depicts a flowchart of an exemplary method for deploying one or more network slices at a service node corresponding to a user device of a telecommunications network in accordance with an example embodiment.

FIG. 3 depicts a flow diagram of an exemplary method 300 for deploying one or more network slices at a service node corresponding to a user device of a telecommunications network, in accordance with implementations of the present disclosure. Initially at block 302 a service request and/or handover request corresponding to the user device is received by a slice management system (e.g., an Access and Mobility management function). The handover request may be an inbound handover. The user device may provide, send, or otherwise transmit the service request or handover request to the slice management system. In some examples, the user device may be associated with a single service node or a plurality of service nodes. At block 304, a service node change from the service request and/or the handover request is determined or otherwise detected by the slice management system.

One or more supported network slices corresponding to at least one of a new service node (e.g., a new serving gNodeB or gNB) or a previous service node (e.g., a previous serving gNodeB or gNB) corresponding to the user device is determined at block 306. Accordingly, the slice management system (e.g., the AMF) may identify the difference of the supported network slices corresponding to the new service node and the previous service node that correspond to the user device. In some embodiments, the previous service node and the new service node may correspond to one or more tracking areas such that the user device may move from and/or between tracking areas.

At block 308, the user device is updated with the one or more supported network slices corresponding to the new service node based on a difference of at least one supported network slice between the previous service node and the new service node. An update command may update the user device with the one or more supported network slices corresponding to the new service node and/or the user device network slice selection policy using URSP. The user device may utilize the allowed NSSAI and/or URSP, for example, that correspond to the new service node to initiate or otherwise request a PDU session release and/or a PDU establishment update according to the supported network slice(s) under the new service node.

Figure 4:
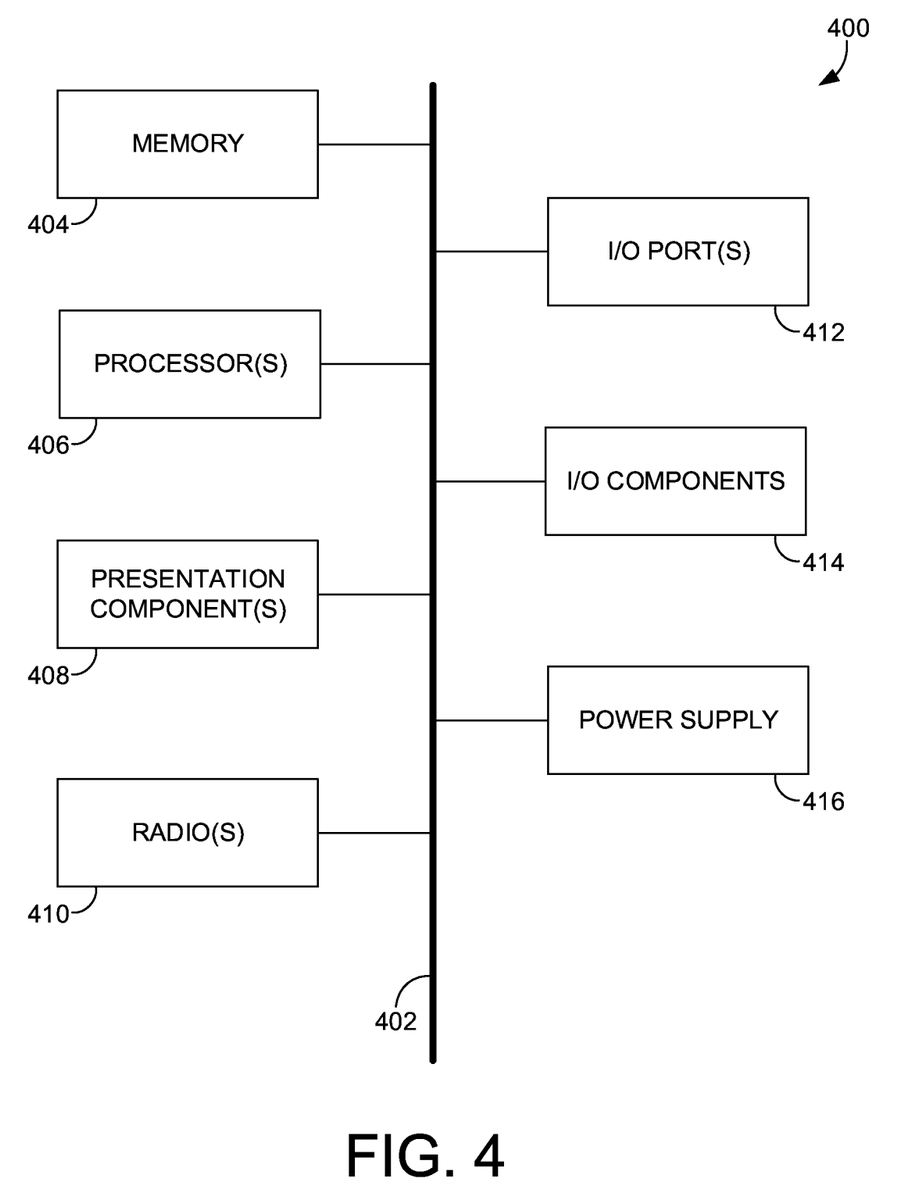
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s). Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for deploying one or more network slices at a service node corresponding to a user device of a telecommunications network, the method comprising:
   receiving, via a slice management system, at least one of a service request or handover request corresponding to a user device;
   determining a service node change from the at least one of the service request or the handover request;
   determining one or more supported network slices corresponding to at least one of a new service node or a previous service node corresponding to the user device;
   detect a difference between the one or more supported network slices corresponding to the previous service node and the one or more supported network slices corresponding to the new service node;
   in response to detecting the difference, transmit an update to the user device to provide an indication of the one or more supported network slices corresponding to the new service node; and
   processing, subsequent to updating the user device, the at least one of the service request or handover request corresponding to the user device according to the one or more supported network slices corresponding to the new service node.

2. The method of claim 1, wherein the previous service node and the new service node correspond to one or more tracking areas.

3. The method of claim 2, wherein the one or more tracking areas are associated with a cell site or a plurality of cell sites.

4. The method of claim 3, wherein the telecommunications network comprises the cell site or the plurality of cell sites, and wherein the cell site or the plurality of cell sites comprise one or more service nodes.

5. The method of claim 1, wherein the telecommunications network comprises a new radio network.

6. The method of claim 1, wherein the previous service node and the new service node comprises a Next Generation Node B.

7. The method of claim 1, wherein an update command is to update the user device with the one or more supported network slices and a user device Network Slice Selection Policy corresponding to the new service node.

8. The method of claim 1, wherein the handover request comprises an inbound handover.

9. The method of claim 1, wherein the slice management system is structured to update the user device with the one or more supported network slices corresponding to a new tracking area based on a difference of at least one supported network slice between a previous tracking area and the new tracking area.

10. Computer-readable storage media having computer-executable instructions embodied thereon that, when executed by one or more processors, cause the processors to:
receive, via a slice management system, at least one of a service request or handover request corresponding to a user device;
determine a service node change from the at least one of the service request or the incoming handover request;
determine one or more supported network slices corresponding to at least one of a new service node or a previous service node corresponding to the user device, wherein the previous service node and the new service node correspond to a tracking area;
detect a difference between the one or more supported network slices corresponding to the previous service node and the one or more supported network slices corresponding to the new service node;
in response to detecting the difference, transmit an update to the user device to provide an indication of the one or more supported network slices corresponding to the new service node; and
processing, subsequent to updating the user device, the at least one of the service request or handover request corresponding to the user device according to the one or more supported network slices corresponding to the new service node.

11. The computer-readable storage media of claim 10, wherein the previous service node and the new service node correspond to a plurality of tracking areas.

12. The computer-readable storage media of claim 11, wherein the tracking area or the plurality of tracking areas are associated with a cell site or a plurality of cell sites.

13. The computer-readable storage media of claim 12, wherein the cell site or the plurality of cell sites comprise one or more service nodes.

14. The computer-readable storage media of claim 10, wherein the previous service node and the new service node comprises a Next Generation Node B.

15. The computer-readable storage media of claim 10, wherein the handover request comprises an inbound handover.

16. A system for deploying one or more network slices at a service node corresponding to a user device of a telecommunications network, the system comprising:
one or more processors; and
memory storing instructions that, when executed by the one or more processors, cause the system to:
receive, via a slice management function, at least one of a service request or handover request corresponding to the user device;
determine a service node change from the at least one of the service request or the handover request;
determine one or more supported network slices corresponding to at least one of a new service node or a previous service node corresponding to the user device;
detect a difference between the one or more supported network slices corresponding to the previous service node and the one or more supported network slices corresponding to the new service node;
in response to detecting the difference, transmit an update to the user device to provide an indication of the one or more supported network slices corresponding to the new service node; and
process, subsequent to updating the user device, the at least one of the service request or handover request corresponding to the user device according to the one or more supported network slices corresponding to the new service node.

17. The system of claim 16, wherein the previous service node and the new service node correspond to one or more tracking areas.

18. The system of claim 17, wherein the one or more tracking areas are associated with a cell site or a plurality of cell sites.

19. The system of claim 18, wherein the telecommunications network comprises the cell site or the plurality of cell sites, and wherein the cell site or the plurality of cell sites comprises one or more service nodes.

20. The system of claim 16, wherein the telecommunications network comprises a new radio network.

* * * * *